(12) United States Patent
Peterson et al.

(10) Patent No.: US 12,151,330 B2
(45) Date of Patent: Nov. 26, 2024

(54) DUST COLLECTOR FOR POWER TOOL

(71) Applicant: MILWAUKEE ELECTRIC TOOL CORPORATION, Brookfield, WI (US)

(72) Inventors: Kenneth D. Peterson, Little Suamico, WI (US); Bryan C. Ward, Wauwatosa, WI (US); James E. Pangerc, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/132,621

(22) Filed: Apr. 10, 2023

(65) Prior Publication Data

US 2023/0241736 A1 Aug. 3, 2023

Related U.S. Application Data

(62) Division of application No. 16/635,837, filed as application No. PCT/US2018/000213 on Aug. 16, 2018, now Pat. No. 11,648,635.

(60) Provisional application No. 62/546,032, filed on Aug. 16, 2017.

(51) Int. Cl.
*B23Q 11/00* (2006.01)

(52) U.S. Cl.
CPC ...... *B23Q 11/0046* (2013.01); *B23Q 11/0071* (2013.01); *B23B 2270/62* (2013.01)

(58) Field of Classification Search
CPC ............ B23Q 11/0042; B23Q 11/0046; B23Q 11/0071; B23B 2270/62; B23B 2270/30; B23B 2251/68
See application file for complete search history.

(56) References Cited

U.S. PATENT DOCUMENTS

| | | | |
|---|---|---|---|
| 2,702,181 A | 2/1955 | Brown et al. |
| 2,792,199 A | 5/1957 | Becker et al. |
| 3,339,435 A | 9/1967 | Heitz |
| 3,583,821 A | 6/1971 | Shaub |
| 3,776,647 A | 12/1973 | Hart |

(Continued)

FOREIGN PATENT DOCUMENTS

| | | |
|---|---|---|
| CM | 203156707 U | 8/2013 |
| CN | 2075994 U | 5/1991 |

(Continued)

OTHER PUBLICATIONS

International Search Report and Written Opinion For Application No. PCT/US2018/000213 dated Dec. 12, 2018 (11 pages).

(Continued)

*Primary Examiner* — Nicole N Ramos
(74) *Attorney, Agent, or Firm* — Michael Best & Friedrich LLP

(57) ABSTRACT

A dust collector is operable to collect dust and debris generated during operation of a power tool. The dust collector includes a mounting base configured to couple to the power tool, a tether coupled to the mounting base, and a shroud extending from the mounting base. The mounting base defines a longitudinal axis. The tether is configured to be wrapped around a portion of the power tool. The shroud includes a first end adjacent the mounting base, a second end operable to contact a workpiece, and a sleeve extending between the first end and the second end.

18 Claims, 8 Drawing Sheets

(56) References Cited

U.S. PATENT DOCUMENTS

| | | | |
|---|---|---|---|
| 3,934,661 A | 1/1976 | Sauerwein et al. | |
| 3,936,213 A | 2/1976 | Kappel | |
| 4,111,208 A | 9/1978 | Leuenberger | |
| RE31,541 E * | 3/1984 | Wood | B65D 63/1081 |
| | | | 24/17 AP |
| 4,466,160 A * | 8/1984 | de Lima Castro Netto | |
| | | | B65D 63/1027 |
| | | | 24/30.5 R |
| 4,515,504 A * | 5/1985 | Moore, Sr. | B23Q 11/0053 |
| | | | 408/72 R |
| 4,558,495 A * | 12/1985 | Olsen | B25B 33/005 |
| | | | 24/298 |
| 4,848,980 A | 7/1989 | Broussard | |
| 4,921,375 A | 5/1990 | Famulari | |
| 4,955,984 A | 9/1990 | Cuevas | |
| 5,061,123 A | 10/1991 | Broussard | |
| 5,160,230 A | 11/1992 | Cuevas | |
| 5,292,210 A | 3/1994 | Nowick | |
| 5,394,592 A * | 3/1995 | Quick | B25F 5/00 |
| | | | 24/17 AP |
| 5,419,663 A | 5/1995 | Psomas | |
| 5,653,561 A | 8/1997 | May | |
| 5,673,829 A * | 10/1997 | Hartshorn | A45F 5/02 |
| | | | 224/256 |
| 5,765,654 A | 6/1998 | Burger | |
| 6,401,305 B1 * | 6/2002 | Joseph | F16L 3/233 |
| | | | 24/17 AP |
| 6,681,451 B1 * | 1/2004 | Adams | B65D 63/1027 |
| | | | 24/17 AP |
| 6,887,146 B2 | 5/2005 | Staas et al. | |
| 7,175,371 B2 | 2/2007 | Vidal | |
| 7,322,429 B2 | 1/2008 | Kim | |
| D588,893 S | 3/2009 | Radich | |
| D590,227 S | 4/2009 | Yun | |
| 7,901,164 B2 | 3/2011 | Skradski et al. | |
| 8,529,170 B2 | 9/2013 | Everington, Jr. | |
| 8,978,781 B2 | 3/2015 | Burdick et al. | |
| 9,296,079 B2 | 3/2016 | Miwa et al. | |
| 9,895,485 B1 * | 2/2018 | McNeill | A61M 5/1415 |
| 2002/0101311 A1 * | 8/2002 | May, III | B25B 11/002 |
| | | | 335/205 |
| 2003/0126959 A1 * | 7/2003 | Khubani | B25B 13/52 |
| | | | 81/64 |
| 2004/0208715 A1 | 10/2004 | Arich | |
| 2007/0243031 A1 | 10/2007 | Yun | |
| 2012/0308320 A1 | 12/2012 | Tseng | |
| 2013/0014351 A1 * | 1/2013 | Kuglen | B65D 63/1027 |
| | | | 24/17 B |
| 2013/0094915 A1 | 4/2013 | Chen | |
| 2013/0206440 A1 * | 8/2013 | Ikuta | B23Q 11/0071 |
| | | | 173/198 |
| 2013/0213683 A1 | 8/2013 | Brewster et al. | |
| 2014/0037392 A1 | 2/2014 | Lo | |
| 2014/0097217 A1 * | 4/2014 | Walsh | B25H 3/006 |
| | | | 224/268 |
| 2015/0360298 A1 | 12/2015 | Buczek | |
| 2016/0045686 A1 | 2/2016 | Jaroslavsky | |
| 2017/0066095 A1 | 3/2017 | Chen | |
| 2017/0368655 A1 | 12/2017 | Bergman et al. | |

FOREIGN PATENT DOCUMENTS

| | | | |
|---|---|---|---|
| CN | 2135433 Y | 6/1993 | |
| CN | 2435193 Y | 6/2001 | |
| CN | 2439355 Y | 7/2001 | |
| CN | 2880398 Y | 3/2007 | |
| CN | 2908667 Y | 6/2007 | |
| CN | 201427302 Y | 3/2010 | |
| CN | 101733737 Y | 6/2010 | |
| CN | 201534233 U | 7/2010 | |
| CN | 201559184 U | 8/2010 | |
| CN | 201791709 U | 4/2011 | |
| CN | 201863191 U | 6/2011 | |
| CN | 103085036 A | 5/2013 | |
| CN | 203076644 U | 7/2013 | |
| CN | 203125487 U | 8/2013 | |
| CN | 103567501 A | 2/2014 | |
| CN | 104440801 A | 3/2015 | |
| CN | 105499648 A | 4/2016 | |
| CN | 205254930 U | 5/2016 | |
| CN | 205362767 U | 7/2016 | |
| DE | 2434641 A1 | 1/1976 | |
| DE | 202008003462 U1 * | 6/2008 | B25F 5/026 |
| EP | 1457288 A1 | 9/2004 | |
| EP | 1842612 A1 | 10/2007 | |
| EP | 2191941 B1 * | 3/2012 | B25D 17/043 |
| WO | 0041453 A2 | 7/2000 | |
| WO | 2011054988 A2 | 5/2011 | |

OTHER PUBLICATIONS

Examination Report No. 1 issued by the Australian Government for Application No. 2018318699 dated Oct. 21, 2020 (4 pages).

* cited by examiner

DUST COLLECTOR FOR POWER TOOL

CROSS-REFERENCE TO RELATED APPLICATIONS

This application is a divisional of U.S. Non-Provisional patent application Ser. No. 16/635,837, filed on Jan. 31, 2020, now U.S. Pat. No. 11,648,635, which is a national phase filing under 35 U.S.C. 371 of International Application No. PCT/US2018/000213, filed on Aug. 16, 2018, which claims priority to U.S. Provisional Patent Application No. 62/546,032, filed on Aug. 16, 2017, the entire contents of which are incorporated herein by reference.

FIELD OF THE INVENTION

The present invention relates to dust containment for a power tool.

BACKGROUND OF THE INVENTION

During operation of a rotary power tool (e.g., a drill/driver, hammer drill, etc.), an operator may drive a fastener into a workpiece, drill a hole in a workpiece, or mount additional tools on the working end of the power tool to perform other various tasks. While performing, for example, a drilling operation, dust and other debris can be accumulated from the workpiece. In some situations, dust and other debris from the workpiece is undesirable as particles may become airborne and create a dusty or unsafe worksite. The workpiece may also be in hard-to-reach areas where cleanup of the debris is difficult or the workpiece may be overhead where unwanted debris may fall on the operator.

SUMMARY OF THE INVENTION

The invention provides, in one aspect, a dust collector operable to collect dust and debris generated during operation of a power tool. The dust collector includes a mounting base configured to couple to the power tool. The mounting base defines a longitudinal axis. The dust collector also includes a shroud extending from the mounting base. The shroud includes a first end adjacent the mounting base, a second end operable to contact a workpiece, a sleeve extending between the first end and the second end, and a spring biasing the second end away from the first end. The second end is movable relative to the first end against the spring.

The invention provides, in another aspect, a dust collector operable to collect dust and debris generated during operation of a power tool. The dust collector includes a mounting base configured to couple to the power tool. The mounting base defines a longitudinal axis. The dust collector also includes a tether coupled to the mounting base. The tether is configured to be wrapped around a portion of the power tool. The dust collector further includes a shroud extending from the mounting base. The shroud includes a first end adjacent the mounting base, a second end operable to contact a workpiece, and a sleeve extending between the first end and the second end.

The invention provides, in yet another aspect, a power tool system including a power tool having a housing, a working end, and a tool bit extending from the working end. The power tool system also includes a dust collector operable to collect dust and debris generated during operation of the power tool. The dust collector includes a mounting base seated against the working end of the power tool. The mounting base defines an aperture through which the tool bit extends and a longitudinal axis along which the tool bit extends. The dust collector also includes a tether coupled to the mounting base. The tether is wrapped around a portion of the housing to secure the dust collector to the power tool. The dust collector further includes a shroud extending from the mounting base. The shroud has a first end adjacent the mounting base, a second end operable to contact a workpiece, a sleeve extending between the first end and the second end, and a spring biasing the second end away from the first end. The second end is movable relative to the first end against the spring.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
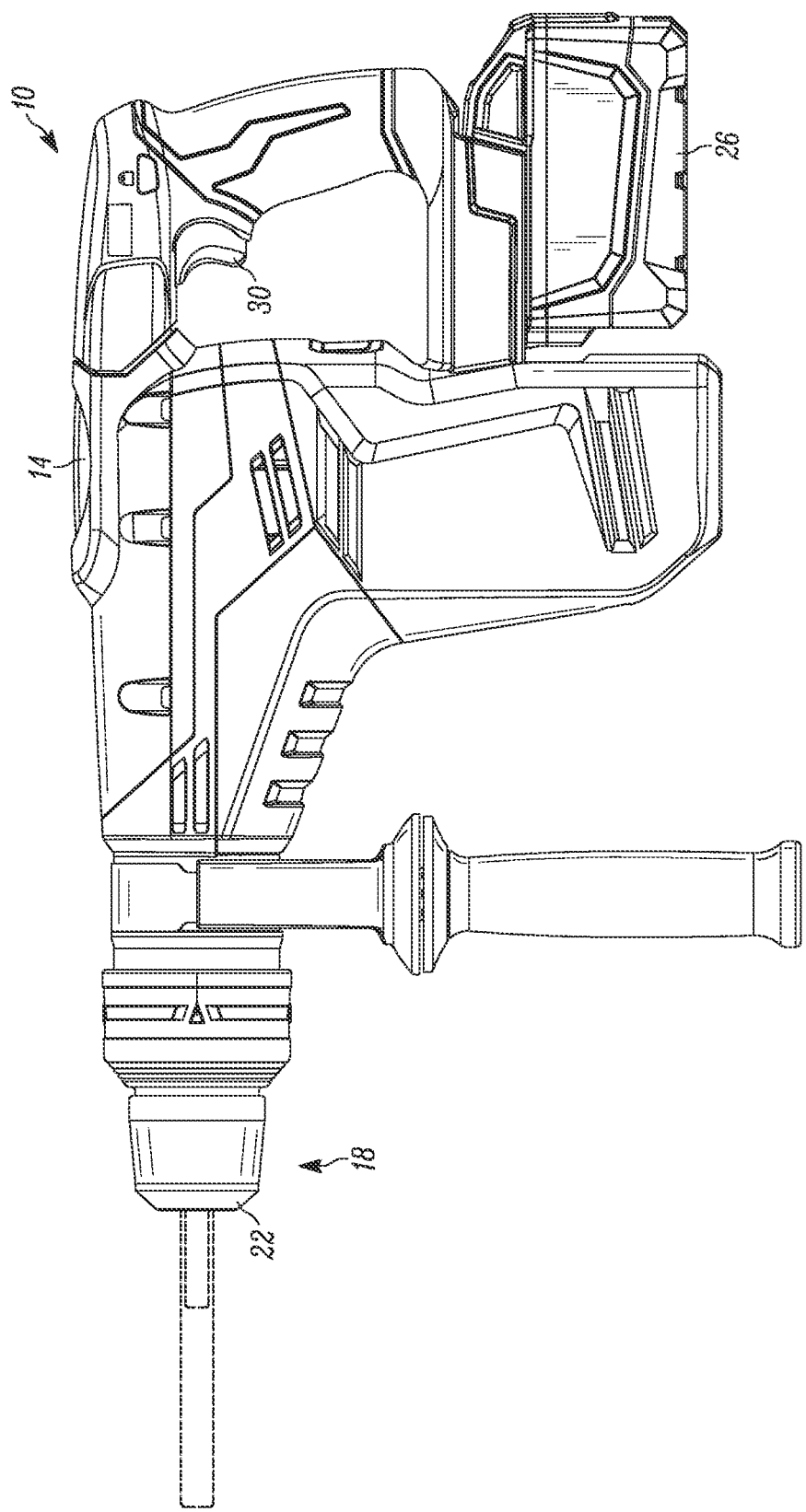
FIG. 1 is a side view of a rotary power tool to be used with a dust collector.

FIG. 1 illustrates a rotary power tool 10, and more specifically a rotary hammer, including a housing 14, a motor (not shown) disposed within the housing 14, and a working end 18 driven by activation of the motor. A tool bit may be secured to the working end 18 for co-rotation with the working end 18 (e.g., using a spline fit) and performing work on a workpiece. In the illustrated construction, the rotary power tool 10 includes a quick-release mechanism 22 disposed at the working end 18 to facilitate quick removal and replacement of different tool bits. The motor of the rotary power tool 10 is configured as a DC motor that receives power from an on-board power source (e.g., a battery 26). The battery 26 may include any of a number of different nominal voltages (e.g., 12V, 18V, etc.), and may be configured having any of a number of different chemistries (e.g., lithium-ion, nickel-cadmium, etc.). Alternatively, the motor may be powered by a remote power source (e.g., a household electrical outlet) through a power cord. The motor is selectively activated by depressing a trigger 30 or other actuator.

Figure 2:
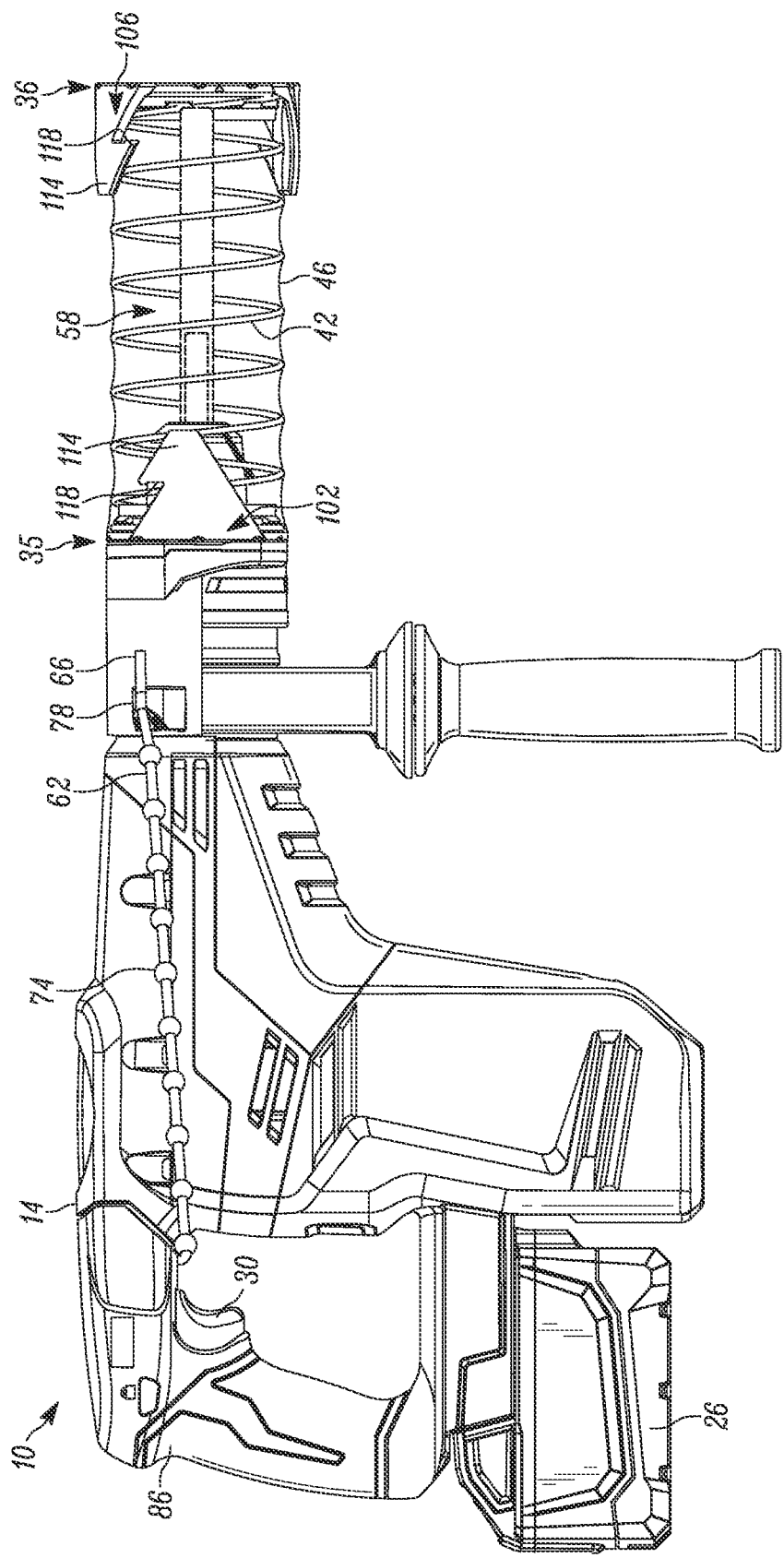
FIG. 2 is a side view of a dust collector attached to the power tool of FIG. 1 and having various tool bits coupled to the tool.

FIGS. 2-5 illustrate a dust collector 34 for use with the power tool 10. The dust collector 34 is selectively coupled to the rotary power tool 10 and defines a first end 35 configured to abut the power tool 10 and a second end 36 configured to abut a workpiece while in use, as shown in FIG. 2. The dust collector 34 effectively acts as a shroud 37 around the working end 18 and a tool bit to collect dust and debris during operation. The illustrated dust collector 34 includes a mounting base 38 adjacent the first end 35, a spring 42 extending away from the mounting base 38 toward the second end 36, and a sleeve 46 disposed around the spring 42.

Figure 3:
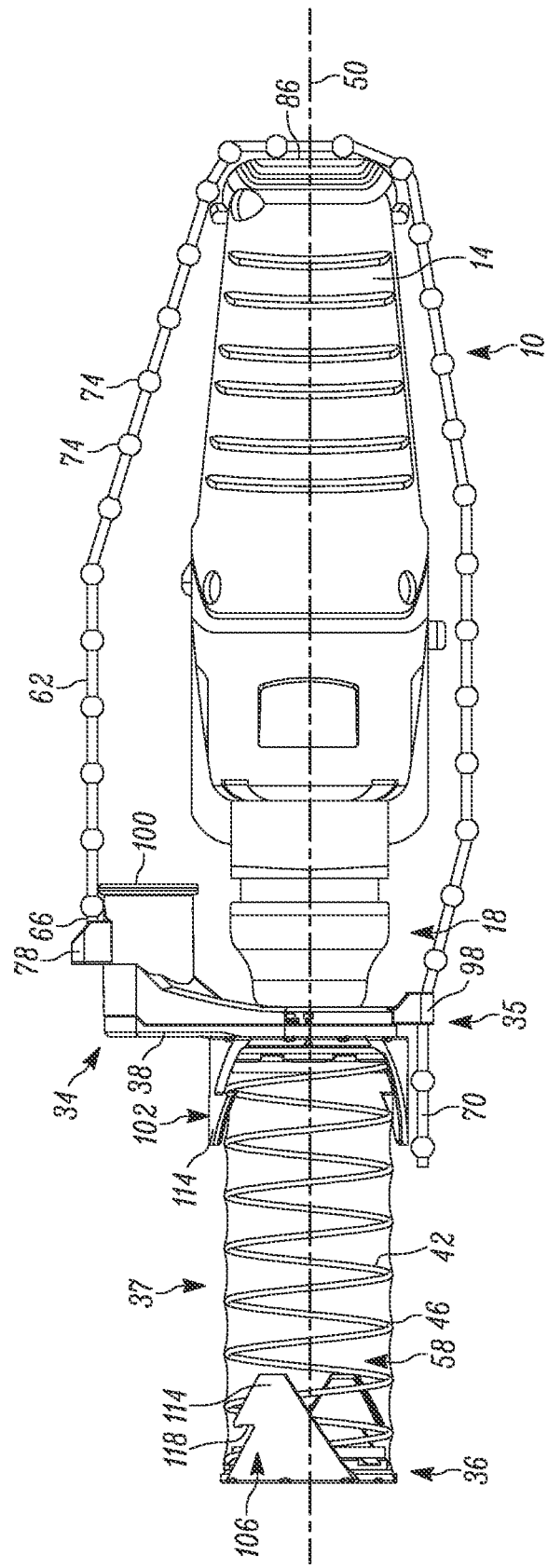
FIG. 3 is a top view of the dust collector attached to the power tool of FIG. 1 with a tether secured to the power tool.

The mounting base 38 defines a longitudinal axis 50 (FIG. 4) along which the dust collector 34 receives the rotary power tool 10. The base 38 seats against the working end 18 of the power tool 10 when the dust collector 34 is connected to the power tool 10. As best shown in FIGS. 2 and 3, the base 38 abuts an end of the tool 10, such as the chuck assembly. Through such an abutment, the dust collector 34 can be used with substantially any drill-style power tool 10, regardless of manufacture. Due to the engagement of the base 38 with the tool 10, the base 38 includes a hardened metal plate which is used as a bearing surface for the chuck assembly of the tool 10. In other embodiments, the hardened metal plate can be replaced with slip washers or bearings. Also, in some embodiments, the dust collector 34 can be configured such that the base 38 can fully receive the chuck assembly of the working end within the shroud 37 (opposed to abutting the end of the chuck assembly).

The base 38 includes an aperture 54 (FIG. 5) that allows a tool bit (e.g., a drill bit) to extend through the base 38 and into a space 58 defined within the sleeve 46. Depending upon the diameter of the bit used, different sized apertures can be provided in the base 38. In preferred embodiments, the aperture 54 is closely matched to the diameter of the bit (or a portion of the bit) to inhibit dust from escaping at this interface. In some embodiments, the base 38 can include a shutter and/or gasket around the aperture 54 to allow the space between the bit and the aperture 54 to be reduced or substantially eliminated.

The spring 42 is coupled to the base 38 and extends between the first end 35 and the second end 36. In the illustrated embodiment, the spring 42 is a coil spring. In other embodiments, the spring 42 may be a different type of spring extending between the first and second ends 35, 36. The spring 42 facilitates movement of the second end 36 relative to the first end 35 as a tool bit is gradually drilled into a workpiece. The spring 42 (and therefore the dust collector 34) compresses as the working end 18 of the power tool 10 moves closer to the workpiece such that the dust collector 34 does not interfere with the bit engaging the workpiece. The sleeve 46 also extends between the first end 35 and the second end 36, and entraps dust and debris within the space 58 during a drill operation. Due to the rigidity of the spring 42 and the ends 35, 36, the bit does not engage or contact the sleeve 46 prior to engagement with the workpiece (e.g., while cantilevered) or during use. In other words, the spring 42 and the sleeve 46 are circumferentially disposed around the longitudinal axis 50.

The sleeve 46 is composed of a flexible material (e.g., fabric, plastic, etc.) that is capable of folding and bending onto itself while also inhibiting dust particles from escaping the sleeve 46. In other embodiments, the sleeve 46 may be a flexible bellows or other suitable device that is capable of longitudinal movement with the spring 42 and can entrap dust particles, yet is durable and robust. Additionally or alternatively, the sleeve 46 may be made of or coated with a material that resists dust from clinging to the sleeve 46. The sleeve 46 is made of a clear material to maintain visibility inside the shroud 37. In some embodiments, the sleeve 46 may be made of a material having a thickness of 0.003 inches (3 mil or 300 gauge) and a haze of 6.5%. For example, the sleeve 46 may be composed of high-abuse shrink film manufactured by CorTuff®. In other embodiments, the sleeve 46 may have a haze that is less than 6.5%. In further embodiments, the sleeve 46 may be composed of blow molded high-density polyethylene (HDPE) film having a thickness of, for example, 0.001 inches (1 mil).

In some embodiments, the sleeve 46 may be composed of a material having a natural resiliency. In such embodiments, the material of the sleeve 46 itself may provide a spring force to facilitate movement of the second end 36 away from the first end 35. The spring 46 may therefore be omitted or considered integrated into the sleeve 46.

With continued reference to FIGS. 2-5, the dust collector 34 includes a tether 62 for selectively mounting the dust collector 34 on the power tool 10. The tether 62 is composed of a polymer material having elasticity for allowing the tether 62 to flex slightly. As shown in FIG. 3, the tether 62 includes a first end 66, a second end 70, and a plurality of bulbous elements 74 disposed between the first end 66 and the second end 70. The first end 66 of the tether 62 is coupled to the mounting base 38 at a first anchor 78. One of the bulbous elements 74 is received within the anchor 78. In contrast, the second end 70 (or proximate thereto) of the tether 62 is selectively couplable to a second anchor 98 of the mounting base 38 via another one of the bulbous elements 74. The first and second anchors 78, 98 are disposed on opposite sides of the mounting base 38. In some embodiments, the tether 62 can be permanently (or semi-permanently (i.e., detachable for replacement)) coupled to the first anchor 78.

Figure 4:
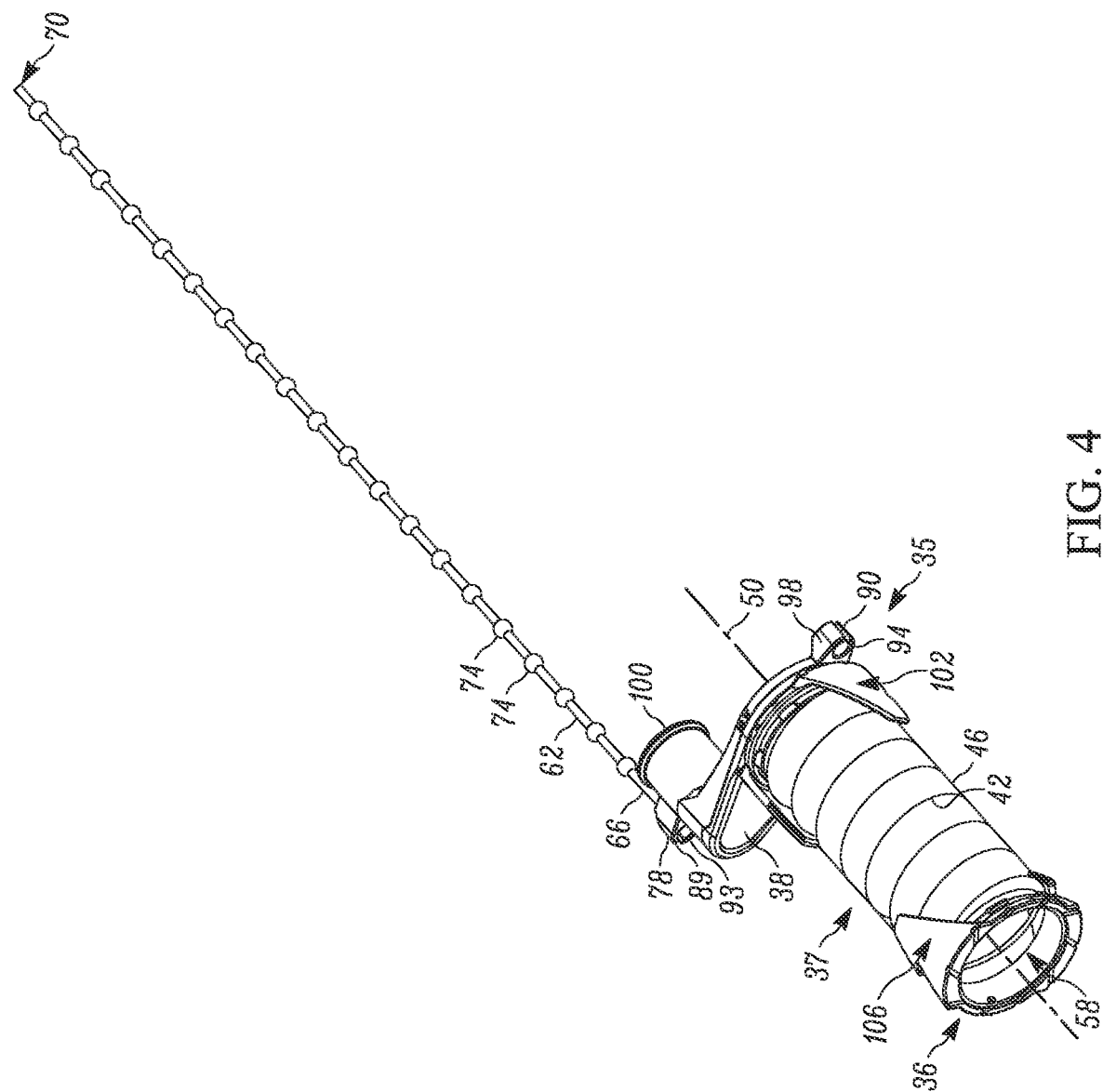
FIG. 4 is a perspective view of the dust collector in an extended position.

In order to maintain a connection between the dust collector 34 and the power tool 10, the tether 62 is coupled to the first anchor 78 and wrapped around various portions of the tool 10 to couple the dust collector 34 to the tool 10. The second end 70 (or proximate thereto) of the tether 62 is coupled to the second anchor 98. As illustrated in FIG. 2, for example, the tether 62 can pass through an opening in the housing 14 near the tool actuator or trigger 30. Alternatively, the tether 62 can be wrapped around a rear end 86 of the housing 14, as shown in FIG. 3. Depending upon the configuration of the tool 10, other features may be used to tether the dust collector 34 to the tool 10. A portion near the first end 66 of the tether 62 between adjacent bulbous elements 74 passes through a slot 89 in the first anchor 78, and one of the bulbous elements 74 seats within a concave seat 93 of the first anchor 78, as illustrated in FIG. 4. Similarly, a portion near the second end 70 of the tether 62 between adjacent bulbous elements 74 passes through a slot 90 in the second anchor 98 and one of the bulbous elements 74 seats within a concave seat 94 of the second anchor 98. The tether 62 is pulled taut so the bulbous element 74 remains seated within the concave seats 93, 94 as a result of the elasticity of the tether 62. The bulbous elements 74 are spaced apart at equal distances along the tether 62 to accommodate different sized power tools 10. Although the tether 62 of the illustrated embodiment is composed of an elastic polymer material, in other embodiments, the tether 62 may alternatively be a Velcro® strap or other suitable type strap or cord.

Figure 5:
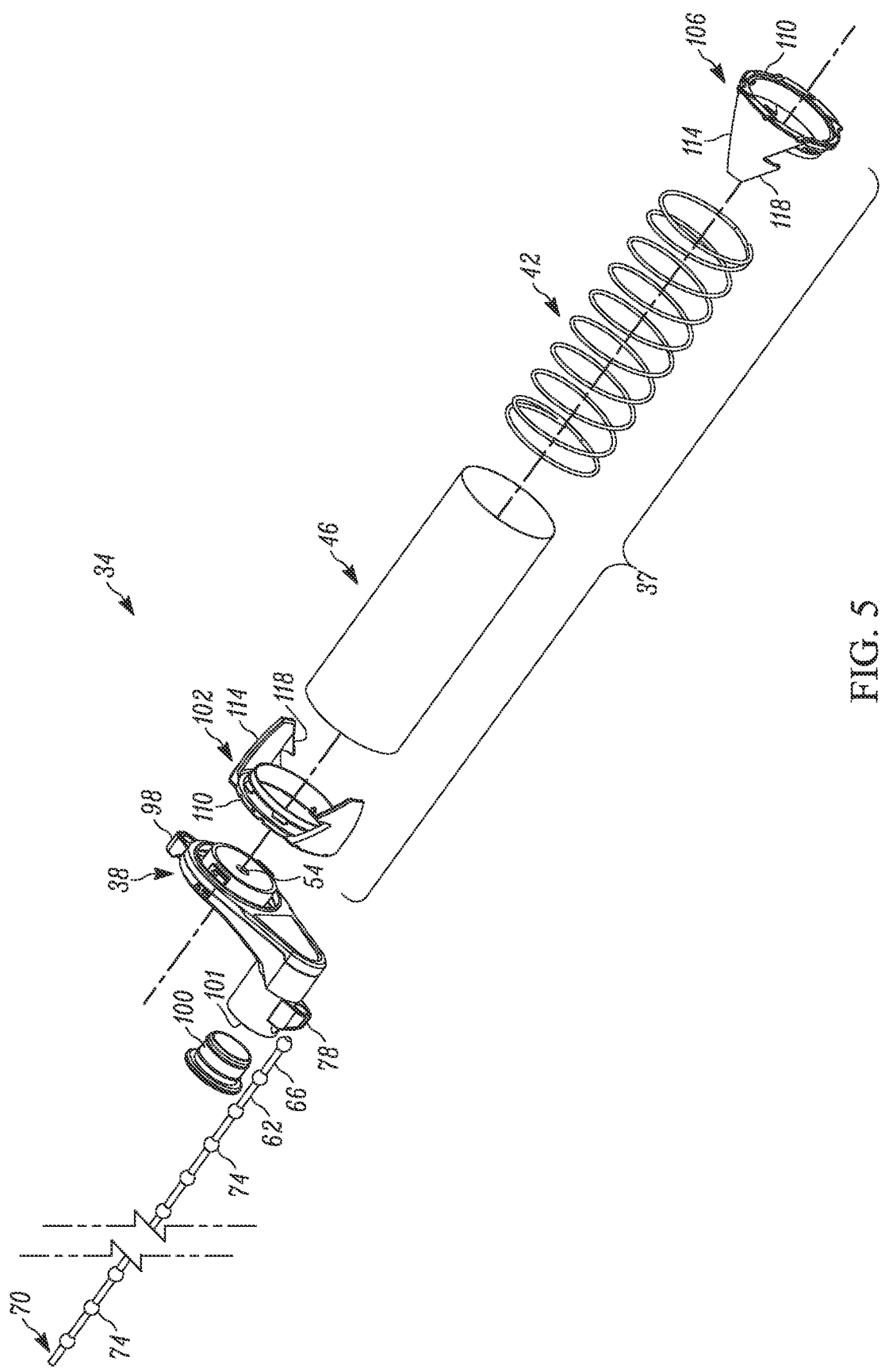
FIG. 5 is an exploded view of the dust collector.
Figure 6:
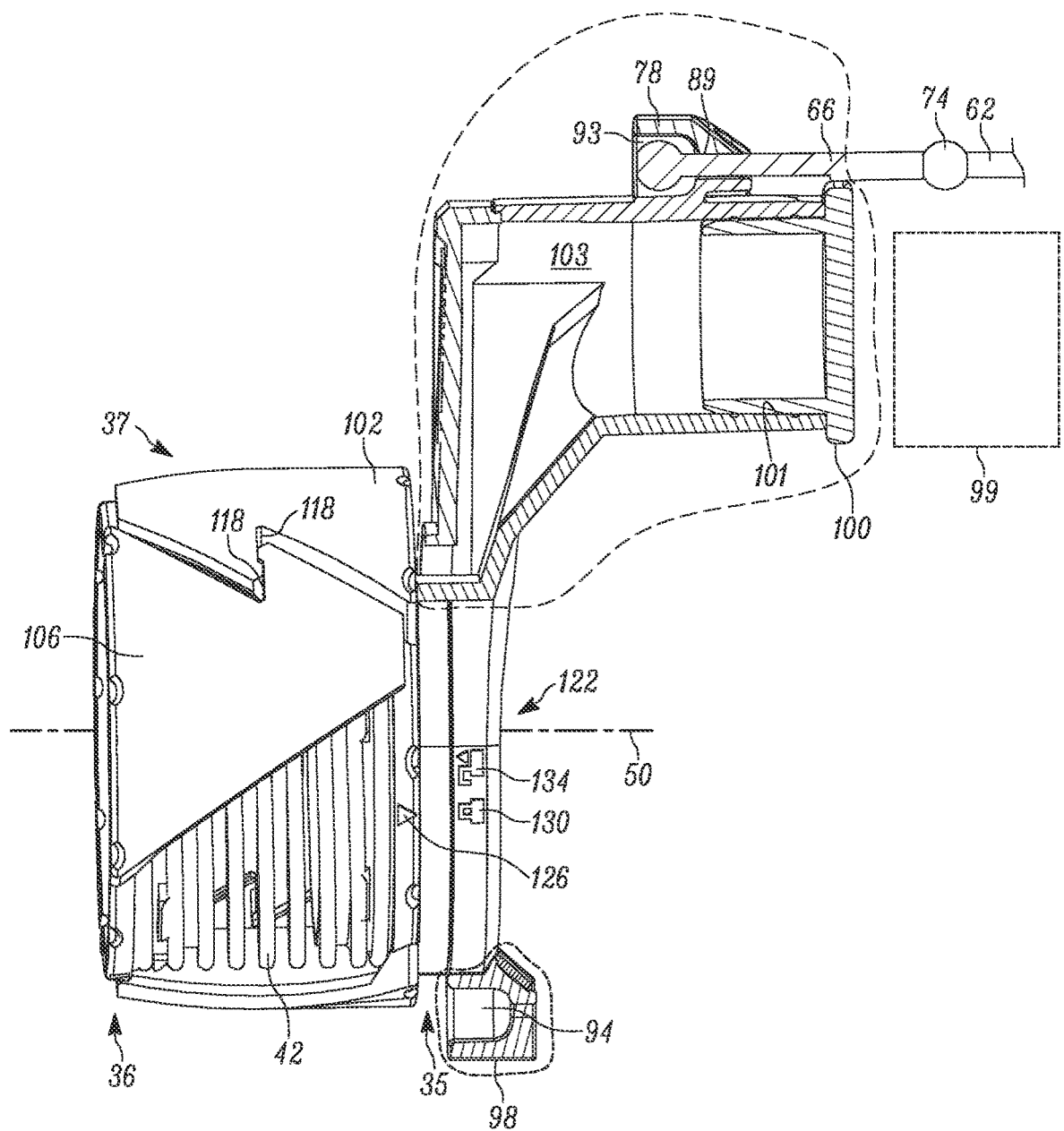
FIG. 6 is a partial cross-sectional view of the dust collector in a collapsed position, illustrating a vacuum pathway.

With reference to FIGS. 5 and 6, a plug 100 disposed near the first end 66 of the tether 62. The plug 100 selectively closes off a vacuum port 101. In a situation where an operator desires to vacuum the dust and debris from the space 58, a vacuum source 99 can be coupled to the vacuum port 101 once the plug 100 is removed. A passageway 103 formed in the mounting base 38 places the vacuum port 101 in fluid communication with the space 58, allowing the dust and debris to be drawn out. In such a situation, an operator would remove plug 100 from the vacuum port 101, and connect the tether 62 between the first anchor 78 and the second anchor 98 to maintain the dust collector 34 on the power tool 10. In some embodiments, the plug 100 may also be coupled to the tether 62 such that the tether 62 keeps the plug 100 coupled to the dust collector 34 when not in use to inhibit the plug 100 from getting lost.

With continued reference to FIGS. 4-6, the dust collector 34 is moveable between an extended position (FIG. 4) and a collapsed position (FIG. 6). The dust collector 34 includes a first connector 102 disposed at the first end 35 and a second connector 106 disposed at the second end 36 that maintain the dust collector 34 in the collapsed position. The first and second connectors 102,106 each include an annular ring 110 with multiple projections 114 extending away from the annular ring 110. As illustrated in FIG. 5, the projections 114 of the first connector 102 extend toward the projections 114 of the second connector 106. Each projection 114 includes a stepped surface or shoulder 118. The shoulder 118, for example, of the first connector 102 interlocks with the shoulder 118 of the second connector 106 for maintaining the dust collector 34 in the collapsed position, as shown in FIG. 6. This arrangement can protect the shroud 37 from damage when not in use (e.g., during transport and storage) and can help hold the dust collector 34 in the collapsed positon when changing tool bits. In contrast, the first and second connectors 102, 106 are spaced apart from each other when the dust collector 34 is in the extended position, as shown in FIG. 4.

As shown best in FIG. 6, the construction of the shroud 37 utilizing the spring 42 and the sleeve 46 allows the shroud 37 to change lengths quite substantially. In particular, in one embodiment, the shroud 37 measures over eight inches in the extended position (FIG. 4) and less than one inch in the collapsed position (FIG. 6). This allows the dust collector 34 to accommodate relatively short tool bits, such as stop bits, as well as relatively long tool bits, such as an eight inch drill bit (FIG. 2).

With reference to FIG. 6, the dust collector 34 further includes a locking mechanism 122 that removably locks the shroud 37 to the mounting base 38. The locking mechanism 122 may be, for example, a bayonet-style coupling. The shroud 37 is rotatable relative to the mounting base 38 about the longitudinal axis 50 between a locked position (as depicted when arrow 126 aligns with locked symbol 130) and an unlocked position (as depicted when the arrow 126 aligns with the unlock symbol 134). In the locked position, the shroud 37 is connected to the base 38, whereas the shroud 37 is removable from the base 38 in the unlocked position. The shroud 37 is connectable to the mounting base 38 at either the first end 35 or the second end 36. When connected, the shroud 37 and respective end 35 or 36 form a dust seal. In some situations, an operator may desire to remove the shroud 37 from the base 38 if the dust collector 34 is not needed without having to remove the mounting base 38 from the power tool 10. Alternatively, the shroud 37 can be removed from the base 38 when the shroud 37 needs to be replaced.

Figure 7:
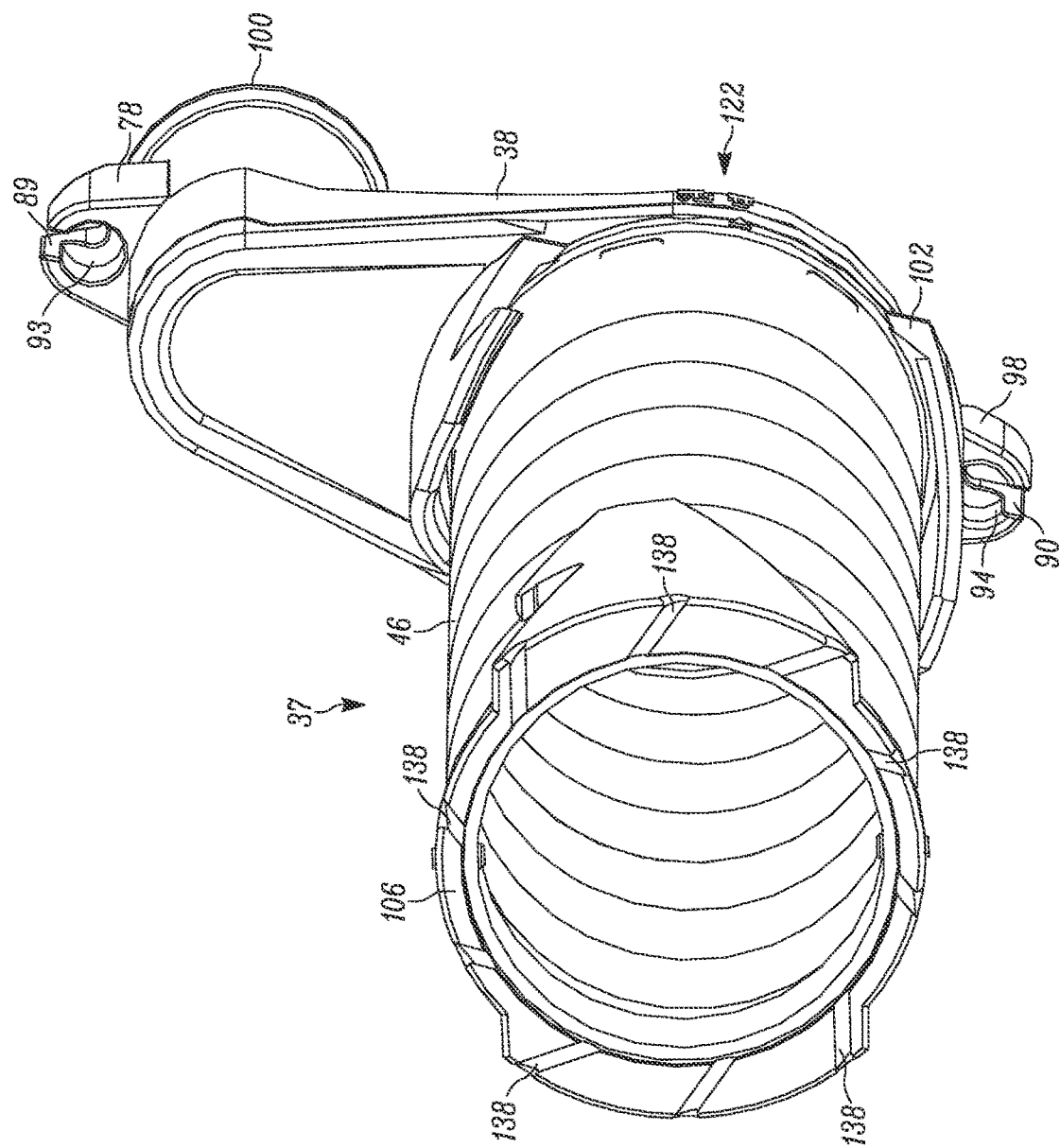
FIG. 7 is a perspective view of the dust collector, showing an end configured to abut a workpiece.

As shown in FIG. 7, ends of the shroud 37 may include air channels 138. The illustrated air channels 138 are formed in a face of the annular ring 110 of the connector 102, 106, facing away from the power tool 10. The air channels 138 can be formed on both the first connector 102 and the second connector 106 for use when either connector is facing outward from the power tool 10. The air channels 138 communicate with the space 58 within the sleeve 46 and extend radially outward. In the illustrated embodiment, the air channels 138 are linear, but may alternatively be curved or irregular. The air channels 138 help draw air through the dust collector 34, pulling dust with the air. In some embodiments, the arrangement of the air channels 138 also creates a vortex or swirl-effect inside the shroud 37.

Prior to a drilling or other operation, an operator places the dust collector 34 over the working end 18 of the power tool 10 until the mounting base 38 abuts the working end 18 (FIG. 2). If a tool bit has a diameter substantially less than the aperture 54 of the base 38, the dust collector 34 can be put into position over the bit. If, however, the tool bit has a diameter fairly close to the diameter of the aperture 54, it may be easier to attach the base 38 first, then couple the bit to the tool 10 through the aperture 54, and finally attach the shroud 37. To fasten the dust collector 34 to the power tool 10, an operator wraps the tether 62 around a portion of the housing 14 (e.g., the rear end 86, near the trigger 30, etc.), seats the first end 66 of the tether 62 in the first anchor 78, and seats the second end 70 of the tether 62 in the second anchor 98 (FIG. 3). If the shroud 37 is in the collapsed position, an operator simply twists the second connector 106 relative to the first connector 102 until the shoulders 118 no longer interfere with each other. At this point, the spring 42 will automatically move the shroud 37 to the extended position. With the shroud 37 adjacent the working end 18 and the tool bit, an operator may begin a drilling operation while collecting the dust and debris within the space 58 within the sleeve 46. If a vacuum source is connected to the vacuum port 101, the dust and debris within space 58 will be drawn out of the space 58, through the passageway 103, and out the vacuum port 101.

During a drilling or other operation, the second end 36 of the shroud 37 and the tool bit are placed in contact with a workpiece. As the operator actuates the trigger 30 (and therefore the motor), the tool bit sinks into the workpiece and the second end 36 of the shroud 37 will move toward the first end 35 until the tool bit travels a desired distance. As the tool bit is drawn out of the workpiece, the second end 36 maintains contact with the workpiece via the spring 42 and dust and debris is collected within the shroud 37 from the drilling operation.

In some applications, a bit longer than a single shroud 37 may need to be used. In such situations, two or more shrouds 37 can be coupled together to fully enclose the bit during use. A connector can be used to connect two shrouds 37 end-to-end. The connector would have similar connecting features 122 as the base 38. The connector would have the connecting features on opposite sides to connect to a first shroud and a second shroud. This arrangement could be repeated to add additional shrouds for additional length.

Figure 8:
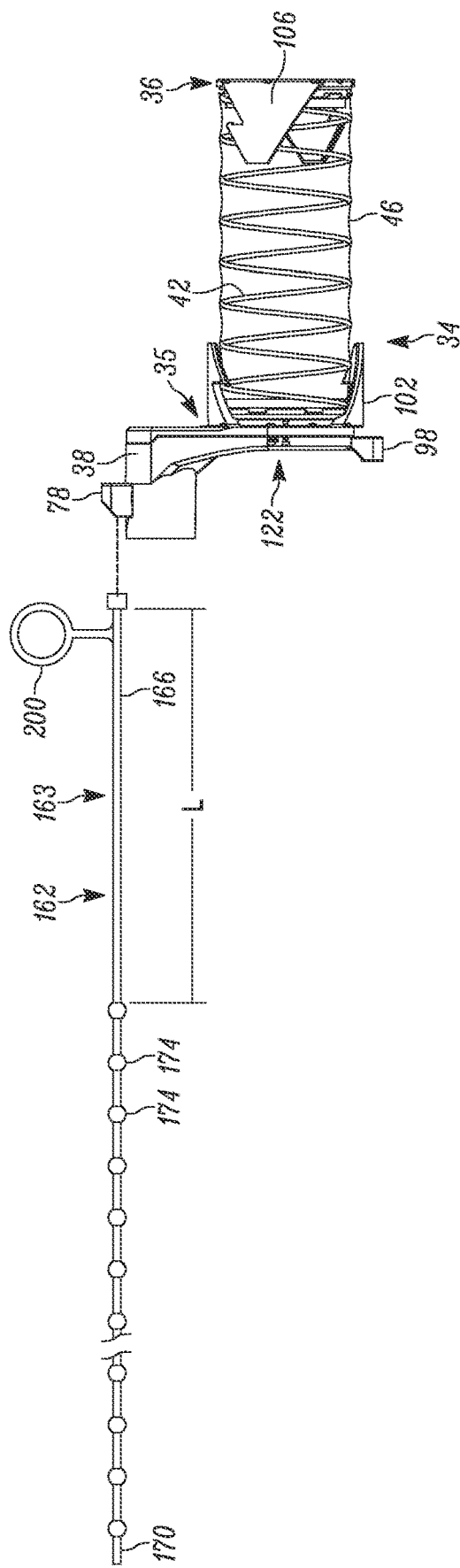
FIG. 8 is a top view of the dust collector, illustrating a tether in accordance with an alternative embodiment of the invention.

FIG. 8 illustrated a tether 162 in accordance with another embodiment of the invention. Like components are shown with like reference numerals plus 100.

The tether 162 can be fabricated to include a non-bulbous segment 163 of the tether 162, in which the bulbous elements 174 are absent. The non-bulbous segment 163 is interposed between a plug holder 200 and an adjacent bulbous element 174. The non-bulbous segment 163 extends a length L, of which can vary in length. Multiple bulbous elements 174 are provided adjacent the second end 170 to ensure adjustability of the tether 162.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A dust collector operable to collect dust and debris generated during operation of a power tool, the dust collector comprising:
   a mounting base configured to couple to the power tool, the mounting base defining a longitudinal axis and including an anchor;
   a tether including a first end coupled to the mounting base, a second end opposite the first end, a length measured between the first end and the second end, and a plurality of bulbous elements spaced apart along at least a majority of the length of the tether, the tether configured to be wrapped around a portion of the power tool such that one of the plurality of bulbous elements engages the anchor to secure the dust collector to the power tool;
   a shroud extending from the mounting base, the shroud including a first end adjacent the mounting base, a second end operable to contact a workpiece, and a sleeve extending between the first end and the second end; and
   a vacuum port coupled to the mounting base, wherein the anchor is positioned on the vacuum port.

2. The dust collector of claim 1, wherein the anchor is a first anchor, and wherein the mounting base further includes a second anchor disposed on an opposite side of the mounting base from the first anchor.

3. The dust collector of claim 2, wherein another of the plurality of bulbous elements adjacent the first end of the tether engages the second anchor to removably couple the tether to mounting base.

4. The dust collector of claim 3, wherein the first anchor is axially offset from the second anchor in a direction parallel to the longitudinal axis.

5. The dust collector of claim 2, wherein adjacent bulbous elements of the plurality of bulbous elements are spaced apart by a constant distance.

6. The dust collector of claim 1, wherein the anchor includes a slot, and wherein a portion of the tether adjacent the bulbous element is received in the slot.

7. The dust collector of claim 6, wherein the anchor includes a concave seat, and wherein the bulbous element seats within the concave seat.

8. The dust collector of claim 1, wherein the first end of the tether is permanently coupled to the mounting base.

9. The dust collector of claim 1, wherein the tether includes a bulbous segment having the plurality of spaced apart bulbous elements, and a non-bulbous segment in which bulbous elements are absent.

10. The dust collector of claim 1, wherein the tether includes a plug holder that is configured to selectively hold a plug for a vacuum port.

11. The dust collector of claim 1, wherein the tether is composed of a polymer material that enables elastic deformation of the tether.

12. A power tool system comprising:
   a power tool including a housing, a working end configured to rotate relative to the housing, and a tool bit extending from the working end and configured to rotate with the working end; and
   a dust collector operable to collect dust and debris generated during operation of the power tool, the dust collector including
      a mounting base seated against the working end of the power tool, the mounting base defining a longitudinal axis and including an anchor,
      a tether including a first end coupled to the mounting base, a second end opposite the first end, and a bulbous element provided on the tether, the tether wrapped around a portion of the housing such that the bulbous element engages the anchor to secure the dust collector to the power tool, and
      a shroud extending from the mounting base, the shroud having a first end adjacent the mounting base, a second end operable to contact a workpiece, and a sleeve extending between the first end and the second end.

13. The power tool system of claim 12, wherein the tool bit extends along the longitudinal axis.

14. The power tool system of claim 12, wherein the mounting base defines an aperture through which the tool bit extends.

15. The power tool system of claim 12, wherein the dust collector includes a spring biasing the second end of the shroud away from the first end of the shroud, the second end being movable relative to the first end against the spring.

16. The power tool system of claim 12, wherein the tether is wrapped around a rear portion of the power tool that is located opposite the working end.

17. The power tool system of claim 12, wherein the housing includes an opening near a trigger, and wherein the tether passes through the opening.

18. The power tool system of claim 12, wherein the dust collector further includes a vacuum port coupled to the mounting base, and wherein the anchor is positioned on the vacuum port.

\* \* \* \* \*